United States Patent [19]

Cerola

[11] 3,797,375

[45] Mar. 19, 1974

[54] STOVE WITH SELECTIVELY INTERCHANGEABLE COOKING APPARATUS

[75] Inventor: Joseph J. Cerola, Indianapolis, Ind.

[73] Assignee: Jenn-Air Corporation, Indianapolis, Ind.

[22] Filed: Mar. 16, 1972

[21] Appl. No.: 235,223

[52] U.S. Cl............ 99/340, 99/421, 99/422, 99/446, 99/447, 219/444, 219/447, 219/460, 219/463, 219/464
[51] Int. Cl................................ A47j 27/12
[58] Field of Search............ 219/400, 403, 443–447, 219/454, 455, 460, 461, 462, 463, 464; 99/259, 340, 400, 421, 422, 446, 447

[56] References Cited
UNITED STATES PATENTS

| 2,798,930 | 7/1957 | Frost................................ 219/444 X |
| 2,867,711 | 1/1959 | Fisher, Jr. et al................... 219/444 |
| 3,712,819 | 1/1973 | Field................................. 99/400 |
| 3,161,755 | 12/1964 | Tilus................................. 219/403 |
| 3,284,612 | 11/1966 | Hanson.............................. 219/455 |
| 3,548,154 | 12/1970 | Christiansson..................... 219/403 |
| 3,674,982 | 7/1972 | Hoyt et al.......................... 219/403 |
| 3,678,844 | 7/1972 | Marshall............................ 99/340 |
| 3,444,805 | 5/1969 | Happel et al....................... 99/340 |
| 3,474,724 | 10/1969 | Jenn.................................. 99/340 X |
| R19,089 | 2/1934 | Parker............................... 219/454 X |
| 2,843,716 | 7/1958 | Del Francia........................ 219/447 X |
| 2,874,631 | 2/1959 | Cooksley........................... 99/400 |
| 3,142,748 | 7/1964 | Warren.............................. 219/454 X |
| 3,627,986 | 12/1971 | Anderson........................... 219/460 |
| 3,632,982 | 1/1972 | Linger............................... 219/447 |

*Primary Examiner*—Volodymyr Y. Mayewsky
*Attorney, Agent, or Firm*—Woodard, Weikart, Emhardt & Naughton

[57] ABSTRACT

A cooking stove or range adaptable for conversion to provide for different types of food cooking. The stove has an open pan — like recess means in the top thereof adaptable to selectively receive interchangeable types of cooking units or apparatus therein.

3 Claims, 8 Drawing Figures

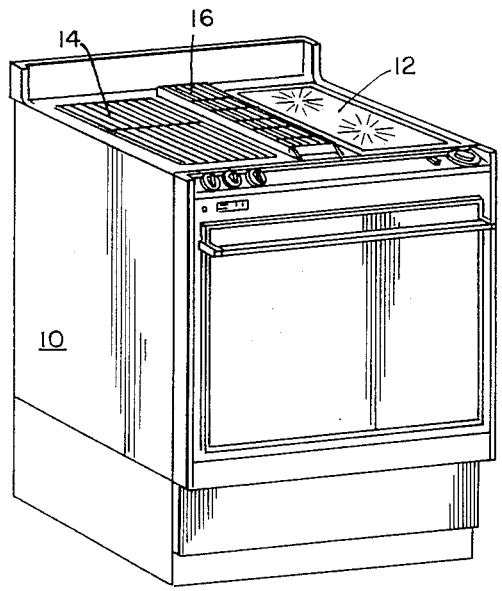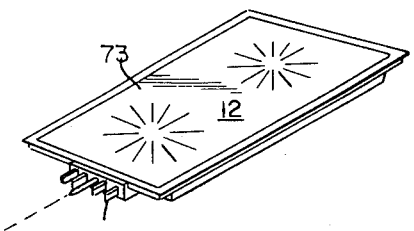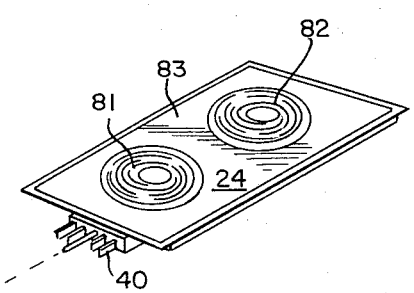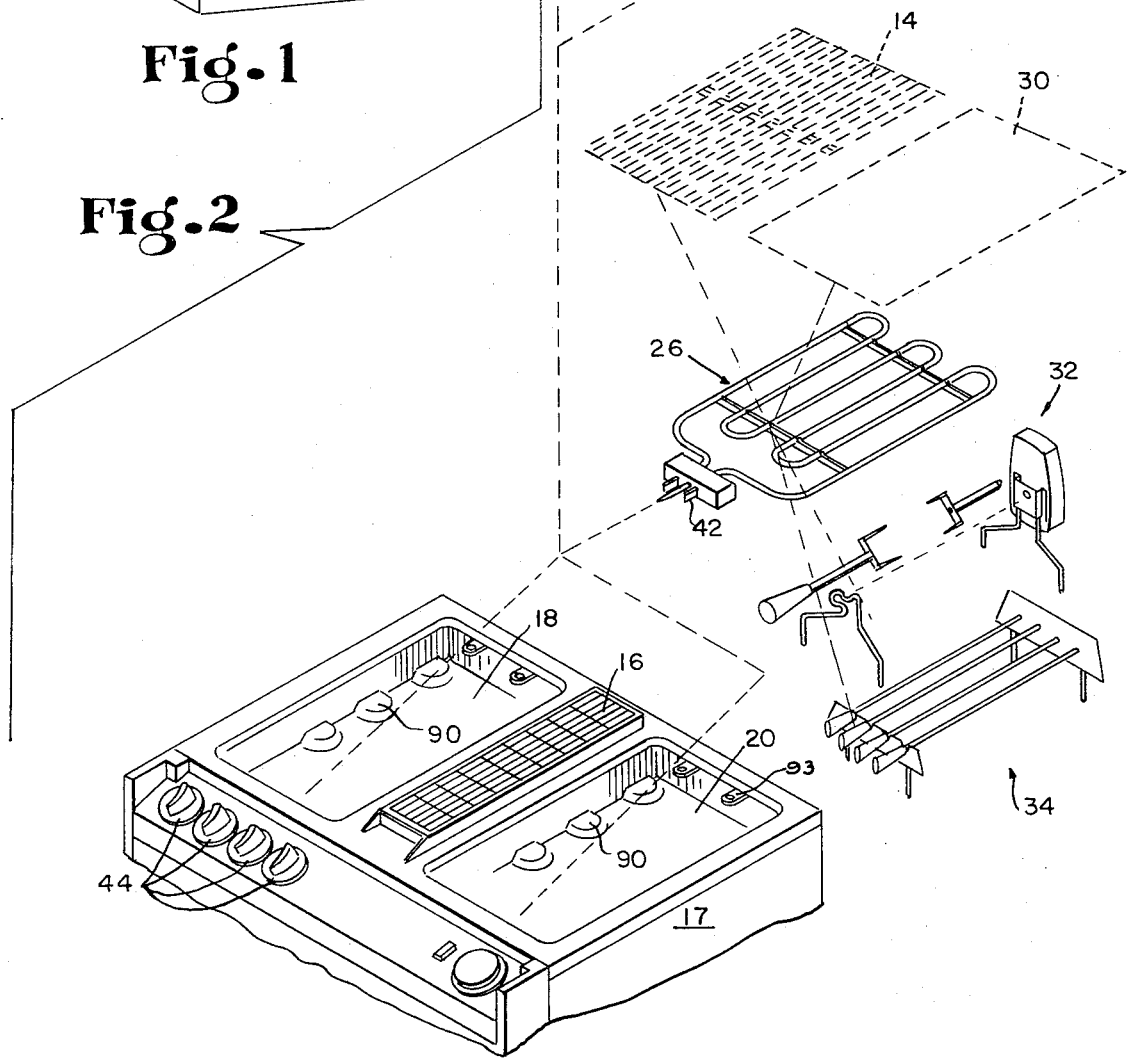
Fig. 1
Fig. 2

PATENTED MAR 19 1974 3,797,375
SHEET 2 OF 2
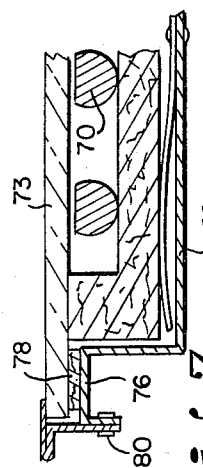
Fig. 8
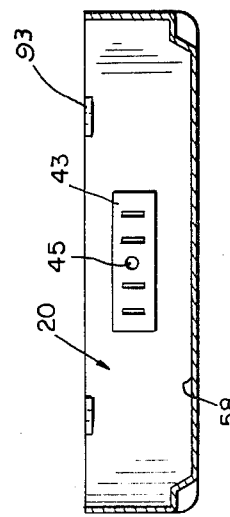
Fig. 3
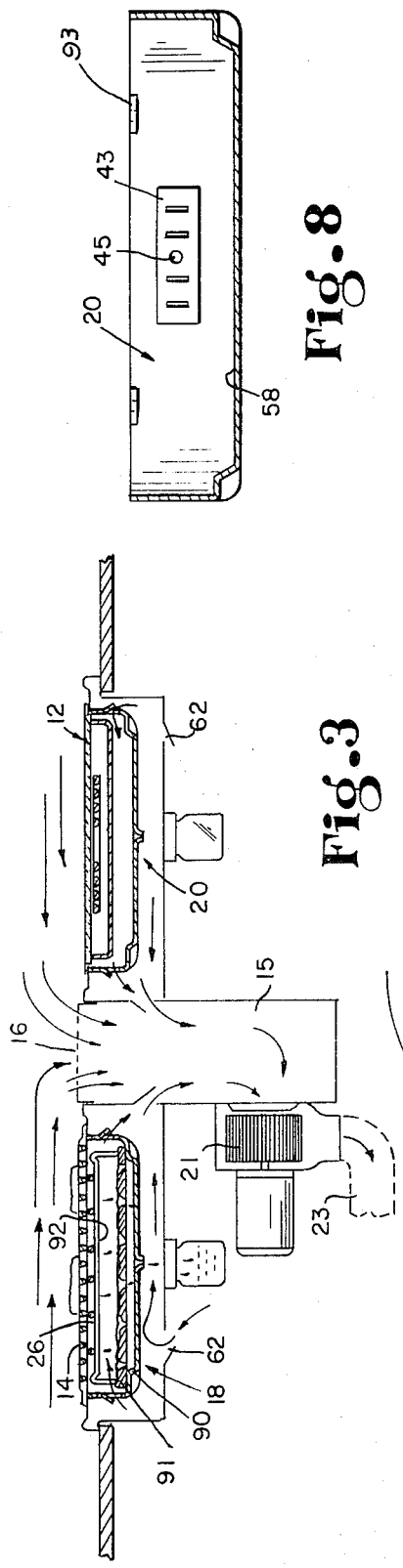
Fig. 4
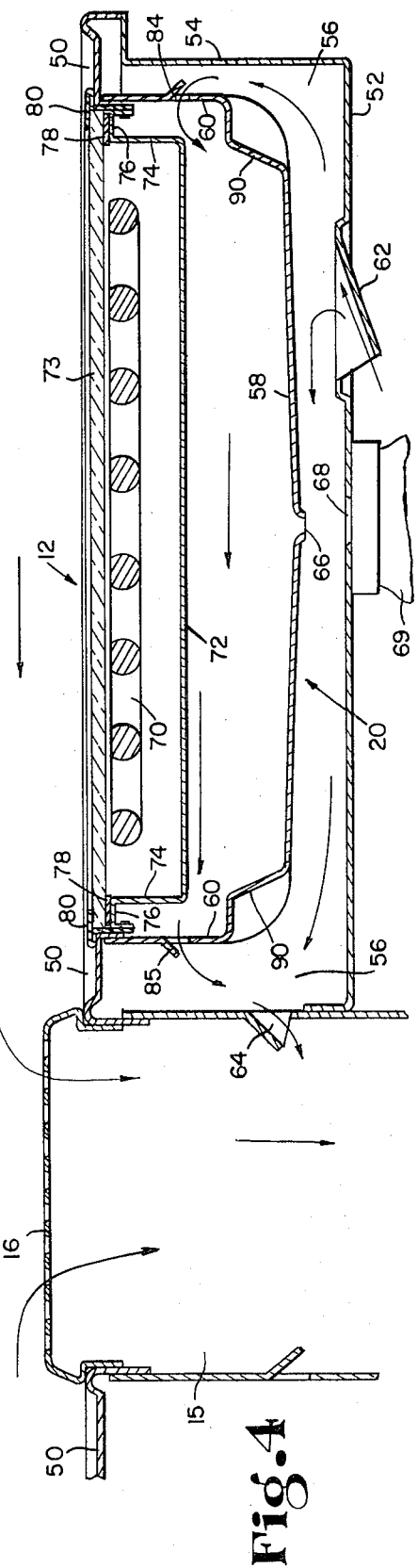
Fig. 5
Fig. 6
Fig. 7
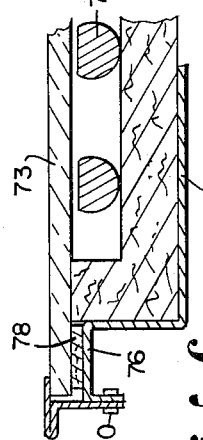
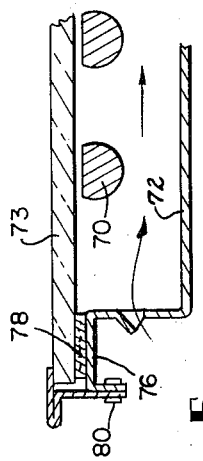

STOVE WITH SELECTIVELY INTERCHANGEABLE COOKING APPARATUS

BACKGROUND OF THE INVENTION

This invention relates generally to a stove or range for providing selectively interchangeable apparatus for accommodating various cooking requirement. More specifically, it relates to a stove having recess means in the top thereof which selectively accommodates various types of cooking apparatus, such as electric heating elements with overlying grill, griddle or rotisserie for open-air cooking; or a self-contained interchangeable cartridge-type unit adapted to support cooking utensils. As the cooking apparatus is received in the recesses, terminals extending from the heating elements are adapted to make contact with an electrical source provided adjacent the recesses.

Additionally, the stove may be provided with forced air ventilating means for entraining smoke, vaporized greases and odor laden gases, caused by cooking foods, for exhaustion to the atmosphere outside a building. The invention is not restricted, however, to use in a range having such ventilation.

BRIEF SUMMARY OF THE INVENTION

It is an object of this invention to provide a stove with selectively interchangeable cooking apparatus.

It is a further object of this invention to provide a stove having recess means in the top thereof for selectively receiving plural types of interchangeable cooking apparatus.

BRIEF DESCRIPTION OF THE DRAWINGS

The invention will be more fully understood and further objects and advantages thereof will become apparent when reference is made to the following detailed description of the preferred embodiment of the invention and the accompanying drawings in which:

FIG. 1 is a perspective view of a free-standing range showing one arrangement of interchangeable cooking units;

FIG. 2 illustrates a stove top adapted to selectively receive cooking units in various combinations;

FIG. 3 is a cross-sectional view taken through the stove for illustrating various components;

FIG. 4 is another cross-sectional view taken through a part of the stove illustrating in detail one recess and a cooking unit;

FIG. 5 is a full scale cross-sectional view of a part of a glass top cooking unit illustrating a ventilating slot;

FIG. 6 is a cross-sectional view of another embodiment of the cooking unit;

FIG. 7 is a cross-sectional view, similar to FIG. 6, showing a still further embodiment;

FIG. 8 is a cross-sectional view taken through one of the stove recesses and looking toward the front wall for showing the electrical receptacle.

DESCRIPTION OF THE PREFERRED EMBODIMENT

Now referring to the drawings, and commencing with FIG. 1, there is illustrated in perspective view a free-standing range 10 provided with a glass covered cartridge-type cooking unit 12 on one side and an open-air broiler 14 on the other side, each interchangeable with the other. This range is provided with an internal power driven exhaust fan and air ducting arrangement (not shown) for drawing a stream of air across each cooking surface for entraining smoke, vaporized grease and odor laden gases and into entrance 16 of air plenum 15 for exhaustion through ducting to the atmosphere exteriorly of a building. Additional, a stream of air may be induced to flow through the range for cooling internal portions or areas of the cooking apparatus.

FIG. 2 illustrates an upper surface of a stove 17 (either a free-standing range or counter drop-in type) provided with pan-like sheet metal recess means 18 and 20 for selectively receiving cooking apparatus such as a glass covered cartridge 12, a cartridge 24 with exposed heating elements or open heating element 26, which is adapted for multiple use with an overlying grill 14, flat griddle 30, rotisserie 32, or shish kebab 34 (or french fryer, not illustrated). Each of the cooking units, whether in cartridge form, as illustrated by numerals 12 or 24, or open heating element 26, is provided with bayonette-type terminals 40 or 42 which are adapted to be removably received in electrical outlet means provided in the front wall of each recess means 18 and 20. FIG. 8, which is a cross sectional view taken through recess 20 and looking toward the front of the range, illustrates electrical outlet 43 adapted to receive either terminals 40 or 42. Electric power to the outlets is controlled through switches 44 at the front of the range. Outlet 43, in addition to having plural terminals receptacles, is also provided with a locator socket 46 for receiving centering pin 48, adjacent the terminals, for aiding proper entry of the bayonette type terminals into the receptacle.

In FIG. 3 there is illustrated in cross section a countertop drop-in type ventilated range having recesses 18 and 20 in the top thereof for receiving cooking units, such as a glass-covered cartridge-type unit 12 or open element and grill for broiling. While the present invention is not restricted to ranges having forced ventilating and cooling air, it is advantageous for lowering or preventing heat build-up in the stove. As illustrated in FIG. 3, ventilating air is drawn from across each cooking unit for entraining smoke and cooking by products for and conveying such through plenum entrance 16 into plenum chamber, through fan 21 and out through ducting 23 for exit to the atmosphere. Additional streams of air may be drawn through or adjacent the recesses or cooking units for cooling, as illustrated by the arrows. This cooling air is drawn into the plenum 15 through side vents and expelled to the atmosphere along with the ventilating air.

The plenum chamber 15 and one recess containing one of the cooking apparatus is shown in considerable more detail in FIG. 4. Since recesses 18 and 20 are identical, only one will be described. The range housing, as shown in FIG. 4, comprises a top defined by sheet portion 50 which has openings therein for providing access to plenum 15 and the recesses. A bottom wall 52 and upstanding side walls 54 thereabout are disposed beneath top 50 in a manner to define a burner box forming. In this space is located a pan-like recess means 20 having bottom wall 58 and side wall 60. Bottom walls 52 and 58, as well as side walls 54 and 60, are spaced apart for defining a conduit which in communication with openings 62 and 64 provides for a stream of air to be drawn past bottom 58 for removing heat therefrom and preventing its transmission to other parts of the range. Bottom wall 58 is preferably provided with a slight slope toward opening 66 which is provided for passage on to jar 69 grease drippings having fallen thereon. However, this provision has no particular utility when some of the other type cooking apparatus are received in the recess.

In the arrangement shown in FIG. 4, a removable cooking unit 12, comprising a pair of electric heating elements 70 provided in an underlying metal housing 72 and covered by a heat transmissive glass plate 73 forms a cartridge - like arrangement adaptable to be received in upwardly facing open recess 20 in position for providing heat for cooking. Housing 72 is provided with side walls 74 and a rim portion 76 for supporting glass plate 73 around its periphery. An asbestos or other type heat resistant resilient gasket 78 may be interposed between the metal rim and glass for proper sealing. A T-shaped hold-down ring 80 surrounds the periphery of the rim and glass and is secured by rivets to a flange portion of the rim, in a manner illustrated in FIGS. 5–7, for holding the parts assembled as a cartridge. The capsule, identified by numeral 12 in FIG. 2 defines a self contained cartridge-type cooking apparatus. The numeral 24 identifies a similar but different cartridge-type cooking unit having open heat coils 81 and 82. Either glass plate 73 or coils 81, 82 adjacent a top plate 83 are provided to support cooking utensils.

In FIG. 5 it is shown that housing 72 of a glass top cartridge-type cooking unit may be provided with openings in the side wall for allowing passage of cooling air. The hold-down ring 80 and gasket 78 are shown at a larger scale.

A molded form 90 of asbestos or similar heat insulating material, as illustrated in FIG. 6, is received in housing 72 to support heating elements 70, and to prevent excessive heat transfer to the bottom of the housing. In FIG. 7, there is illustrated resilient means, such as a leaf spring 91, to underlie molded form 90 for reducing possible strain or shock on glass plate 73.

For inserting cooking apparatus, such as identified by numerals 12 and 24, into a recess 18 or 20, it is required that the front end of a unit containing terminals 40 be lowered first into the recess and then the whole device moved toward the front of the recess for engagement of the bayonette-type terminals with outlet means 43. Thereafter the back end of the cooking unit is lowered into the recess where it is supported in position by the peripheral flanges of ring 80. The steps are reversed for removing a unit. It will be noted in FIG. 4 that openings 84 and 85 on opposite walls 60 of the recess provide for the passage of cooling air in the space between walls 58 and 72 for removing excessive heat.

Either recess 18 or 20 is adapted to receive an open heating element 26 in much the same manner that a cartridge-type unit is received. The end containing terminals 42 is similarly inserted into outlet 43 and the element permitted to be supported from an underlying member 92 on plate 91 which in turn rests on steps 90 on the wall of the pan. With an open element in position in a recess, a grill 14 or griddle 30 is adapted to be supported across the open to the recess for support food. When meat is supported on grill 14, greases from the meat drip onto plate 91 and are permitted to pass therethrough onto the bottom of the pan for collection in jar 69. When griddle 30 is used, greases may be drained from a peripheral trough thereabout into proximity to opening 66 for passage on to collection jar 69.

When the rotisserie 32 or shish kebab 34 are positioned over element 26, legs or locator pins are received in the openings in lugs 93 from which they are supported.

Each cooking unit, whether of the cartridge-type such as identified by numerals 12 and 24, or of the open type heating element 26, for use with a grill, griddle, rotisserie, shish kebab or french fryer, is adapted to be selectively and interchangeably received in either recess.

The foregoing is considered as illustrative only of the principles of the invention. Since it is obvious that numerous modifications and changes will occur to those skilled in the art, it is not desired to limit the invention to the exact construction and operation shown and described. Modifications may be made thereto, or substitutions made, which fall within the scope of the invention as defined by the claims.

What is claimed is:

1. A cooking stove or range for receiving different types of heat sources in the top thereof for accommodating different types of cooking comprising: a housing including at least one burner box having disposed therein a pan shaped member forming an upwardly facing recess in the top thereof defined by walls including a bottom wall having a portion provided in communication with grease collecting means, said recess being provided with electrical outlet means accessibly adjacent thereto, one type of heat source comprising a unitized cartridge type cooking unit including an upper cooking surface heated by electrical resistance means having terminals, another type of heat source comprising open spaced-apart electrical resistance means having terminals and defining a cooking unit for open-air broiling thereover, either of said cooking units adapted to be removably received in said recess with the terminals of its electrical resistance means in removable electrical engagement with said accessible outlet means, said cartridge type cooking unit when removably inserted into said recess having its upper cooking surface substantially closing the throat across said recess and providing a support for cooking utensils resting thereon in heat conducting relation therewith and said cartridge being spaced above the bottom wall of the recess to provide a cooling air space, said open broiling cooking unit when removably inserted into said recess for radiant cooking of meats supported thereover being spaced above the bottom wall of the recess to provide a cooling air space, greases emitted from the meats falling through the openings between the resistance means and onto said bottom wall of the recess for collection in said grease collecting means, and air moving means for forcibly moving air through said cooling air space.

2. The cooking stove as claimed in claim 1 wherein the cooling air is forcibly moved along the upper surface of the recess bottom wall generally as a continuous stream in one direction.

3. A cooking stove or range adapted for removably receiving different types of cooking units in the top thereof for accommodating different types of cooking comprising: a housing including a burner box having side and bottom walls, said housing further including a pan-shaped member forming an upwardly facing recess and having side and bottom walls supported within the burner box and displacing less than the complete volume of the burner box whereby an air plenum is formed between opposing walls, electrical outlet means adjacent the recess, a unitized cartridge type cooking unit having an upper cooking surface heated by electrical resistance means and having underlying side and bottom walls spaced from and beneath said resistance means, whereby when said cartridge type cooking unit is removably inserted into said recess with the resistance means energized through said electrical outlet means, its upper cooking surface substantially closes the throat to the recess and the cartridge type cooking unit displaces less than the complete volume of said recess whereby a second plenum is formed between opposing walls, means for forcibly moving a stream of cooling air through said plenums in heat exchange relationship so as to carry away heat and minimize heat build-up therein.

* * * * *